US010866104B2

(12) United States Patent
Li et al.

(10) Patent No.: US 10,866,104 B2
(45) Date of Patent: Dec. 15, 2020

(54) ROUTE-DEVIATION RECOGNITION METHOD, TERMINAL, AND STORAGE MEDIUM (71) Applicant: TENCENT TECHNOLOGY (SHENZHEN) COMPANY LIMITED, Shenzhen (CN)

(72) Inventors: Bingguo Li, Shenzhen (CN); Wangyu Xiao, Shenzhen (CN); Shuaiwen Yang, Shenzhen (CN); Menglin Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 226 days.

(21) Appl. No.: 16/026,731

(22) Filed: Jul. 3, 2018

(65) Prior Publication Data
US 2018/0321048 A1 Nov. 8, 2018

Related U.S. Application Data (63) Continuation of application No. PCT/CN2017/076101, filed on Mar. 9, 2017.

(30) Foreign Application Priority Data

Mar. 23, 2016 (CN) .......................... 2016 1 0169311

(51) Int. Cl.
*G01C 21/34* (2006.01)
*G01C 21/30* (2006.01)
*G01C 21/20* (2006.01)

(52) U.S. Cl.
CPC ......... *G01C 21/3415* (2013.01); *G01C 21/20* (2013.01); *G01C 21/30* (2013.01)

(58) Field of Classification Search
CPC ..... G01C 21/3415; G01C 21/20; G01C 21/30
(Continued)

(56) References Cited

U.S. PATENT DOCUMENTS 5,523,765 A 6/1996 Ichikawa
5,991,689 A * 11/1999 Aito .................. G01C 21/3461
701/416

(Continued)

FOREIGN PATENT DOCUMENTS

CN 1441260 A 9/2003
CN 1692385 A 11/2005
(Continued)

OTHER PUBLICATIONS

The European Patent Office (EPO) The Extended European Search Report for 17769313.2 dated Mar. 11, 2019 8 Pages.
(Continued)

*Primary Examiner* — Tuan C To
(74) *Attorney, Agent, or Firm* — Anova Law Group, PLLC (57) ABSTRACT A route-deviation recognition method is provided. The method includes obtaining a current positioned-location; and determining a candidate region covering the positioned-location. Road network data corresponding to the candidate region is obtained to generate a plurality of road-segment tree structures according to the obtained road network data. The method also includes obtaining a matching weight between the positioned-location and each road-segment branch in each of the road-segment tree structures. Further, according to the matching weight, a road-segment branch matching the positioned-location is determined as a matched road-segment branch. The method further includes, when
(Continued)

the matched road-segment branch does not belong to a planned navigation route, determining that route-deviation occurs.

11 Claims, 6 Drawing Sheets

(58) Field of Classification Search
USPC .......................................................... 701/416
See application file for complete search history.

(56) References Cited

U.S. PATENT DOCUMENTS

| | | | |
|---|---|---|---|
| 6,282,489 | B1 | 8/2001 | Bellesfield et al. |
| 7,680,596 | B2 * | 3/2010 | Uyeki ................ G01C 21/3415 340/995.19 |
| 2001/0005809 | A1 * | 6/2001 | Ito .................... G08G 1/096894 701/411 |
| 2003/0130789 | A1 | 7/2003 | McDonough |
| 2004/0181336 | A1 | 9/2004 | Omi |
| 2005/0093720 | A1 * | 5/2005 | Yamane ........... G08G 1/096827 340/995.13 |
| 2005/0222763 | A1 * | 10/2005 | Uyeki .............. G08G 1/096716 701/423 |
| 2005/0251324 | A1 * | 11/2005 | Wiener ............ G08G 1/096844 701/414 |
| 2005/0273250 | A1 * | 12/2005 | Hamilton ......... G08G 1/096716 701/532 |
| 2006/0287818 | A1 * | 12/2006 | Okude ............... G01C 21/3694 701/423 |
| 2008/0071472 | A1 | 3/2008 | Yamada |
| 2008/0316060 | A1 * | 12/2008 | Sewaki .................. G01C 21/30 340/995.25 |
| 2011/0221585 | A1 * | 9/2011 | Higuchi ............ G01C 21/3697 340/438 |
| 2013/0096828 | A1 * | 4/2013 | Fujimoto ........... G01C 21/3676 701/533 |
| 2013/0151138 | A1 | 6/2013 | Lu |
| 2013/0204520 | A1 * | 8/2013 | Nomura ............. G01C 21/3658 701/411 |
| 2014/0067256 | A1 | 3/2014 | Aoki et al. |
| 2015/0300825 | A1 * | 10/2015 | Manoliu ................... B60T 7/12 701/36 |

FOREIGN PATENT DOCUMENTS

| | | | | |
|---|---|---|---|---|
| CN | 1779416 | A | 5/2006 | |
| CN | 1996039 | A | 7/2007 | |
| CN | 101408428 | A | 4/2009 | |
| CN | 102102992 | A | 6/2011 | |
| CN | 102445205 | A | 5/2012 | |
| CN | 103542857 | A | 1/2014 | |
| CN | 104034338 | A | 9/2014 | |
| CN | 104154923 | A | 11/2014 | |
| CN | 104596526 | A | 5/2015 | |
| CN | 104613972 | A | 5/2015 | |
| CN | 104769391 | A | 7/2015 | |
| CN | 105352520 | A | 2/2016 | |
| DE | 102016100675 | A1 * | 7/2016 | ............ G01C 21/32 |
| EP | 0747668 | A2 * | 12/1996 | ............ G01C 21/30 |
| EP | 1039266 | A2 * | 9/2000 | ............ G01C 21/30 |
| JP | 04313018 | A * | 11/1992 | |
| JP | H06347278 | A | 12/1994 | |
| JP | H0972749 | A | 3/1997 | |
| JP | H09152345 | A | 6/1997 | |
| JP | H09304092 | A | 11/1997 | |
| JP | 2002269668 | A * | 9/2002 | |
| JP | 2014006190 | A * | 1/2014 | |
| JP | 5640146 | B2 | 12/2014 | |
| WO | 2012141199 | A1 | 10/2012 | |

OTHER PUBLICATIONS

Korean Intellectual Property Office (KIPO) Office Action 1 for 10-2018-7022458 dated Jun. 4, 2019 11 Pages (including translation).
The State Intellectual Property Office of the People's Republic of China (SIPO) Office Action 2 for 201610169311.X dated Dec. 19, 2018 9 Pages (including translation).
The Japan Patent Office (JPO) Notification of Reasons for Refusal for Application No. 2018-540405 and Translation dated Oct. 15, 2019 10 Pages.
The World Intellectual Property Organization (WIPO) International Search Report for PCT/CN2017/076101 dated Jun. 9, 2017 8 Pages (including translation).
The State Intellectual Property Office of the People's Republic of China (SIPO) Office Action 1 for 201610169311.X dated Nov. 1, 2018 8 Pages (including translation).

* cited by examiner

ROUTE-DEVIATION RECOGNITION METHOD, TERMINAL, AND STORAGE MEDIUM

RELATED APPLICATIONS

The present disclosure is a continuation application of PCT Patent Application No. PCT/CN2017/076101, filed on Mar. 9, 2017, which claims priority to Chinese Patent Application No. 201610169311X, entitled "ROUTE-DEVIATION RECOGNITION METHOD AND APPARATUS" filed with the Patent Office of China on Mar. 23, 2016, content of all of which is incorporated by reference in its entirety.

FIELD OF TECHNOLOGY

The present disclosure relates to the field of navigation and positioning technologies, specifically to route-deviation processing during navigation and, in particular, to a route-deviation recognition method, a terminal, and a storage medium.

BACKGROUND

In the field of navigation and positioning, to ensure the navigation accuracy, a terminal device needs to determine whether a current position is off a planned navigation route during navigation, which is referred to as route-deviation recognition. If route-deviation occurs, the terminal device needs to re-plan the navigation route.

A current route-deviation recognition method is to trace back to an ingress node from the current position of the terminal device. A possible route can be determined only based on the ingress node. By determining which possible route actually matches the current position, it can determine whether route-deviation occurred.

However, under the current route-deviation recognition method, the route-deviation-recognition response is slow in the scenario of parallel roads, and the error rate of the route-deviation recognition is high in the scenario of complex intersections.

The disclosed methods and systems are directed to solve one or more problems set forth above and other problems.

SUMMARY

According to various embodiments of the present disclosure, a route-deviation recognition method, a terminal, and a storage medium are provided.

According to one aspect of the present disclosure, a route-deviation recognition method is provided. The method includes obtaining a current positioned-location. A candidate region covering the positioned-location is determined; and road network data corresponding to the candidate region is obtained to generate a plurality of road-segment tree structures according to the obtained road network data. The method also includes obtaining a matching weight between the positioned-location and each road-segment branch in each of the road-segment tree structures. Further, according to the matching weight, a road-segment branch matching the positioned-location is determined as a matched road-segment branch. The method further includes, when the matched road-segment branch does not belong to a planned navigation route, determining that route-deviation occurs.

According to another aspect of the present disclosure, a terminal is provided. The terminal includes a memory storing computer-readable instructions; and a processor coupled to the memory. When executing the computer-readable instructions, the processor is configured to perform: obtaining a current positioned-location; determining a candidate region covering the positioned-location; and obtaining road network data corresponding to the candidate region to generate a plurality of road-segment tree structures according to the obtained road network data. A matching weight between the positioned-location and each road-segment branch is obtained in each of the road-segment tree structures. Further, according to the matching weight, a road-segment branch matching the positioned-location is obtained as a matched road-segment branch. The processor is configured to perform: when the matched road-segment branch does not belong to a planned navigation route, determining that route-deviation occurs.

According to another aspect of the present disclosure, a non-transitory computer-readable storage medium is provided. The non-transitory computer-readable storage medium stores computer program instructions executable by at least one processor to perform: obtaining a current positioned-location; and determining a candidate region covering the positioned-location. Road network data corresponding to the candidate region is obtained to generate a plurality of road-segment tree structures according to the obtained road network data. A matching weight between the positioned-location and each road-segment branch in each of the road-segment tree structures is obtained. The computer program instructions further cause the at least one processor to perform: determining, according to the matching weight, a road-segment branch matching the positioned-location as a matched road-segment branch; and when the matched road-segment branch does not belong to a planned navigation route, determining that route-deviation occurs.

Details of one or more embodiments of the present disclosure are provided in the following accompanying drawings and descriptions. Other features, objectives, and advantages of the present disclosure become more obvious with reference to the specification, the accompanying drawings, and the claims.

BRIEF DESCRIPTION OF THE DRAWINGS

To describe the technical solutions in the embodiments of the present disclosure, the following briefly describes the accompanying drawings. Apparently, the accompanying drawings in the following description show merely some embodiments of the present disclosure, and a person of ordinary skill in the art may derive other drawings from these accompanying drawings without creative efforts.

DETAILED DESCRIPTION

To make the objectives, technical solutions, and advantages of the present disclosure clearer and more comprehensible, the following further describes the present disclosure in detail with reference to the accompanying drawings. It should be understood that the specific embodiments described herein are merely used to explain the present disclosure but are not intended to limit the present disclosure.

Figure 1:
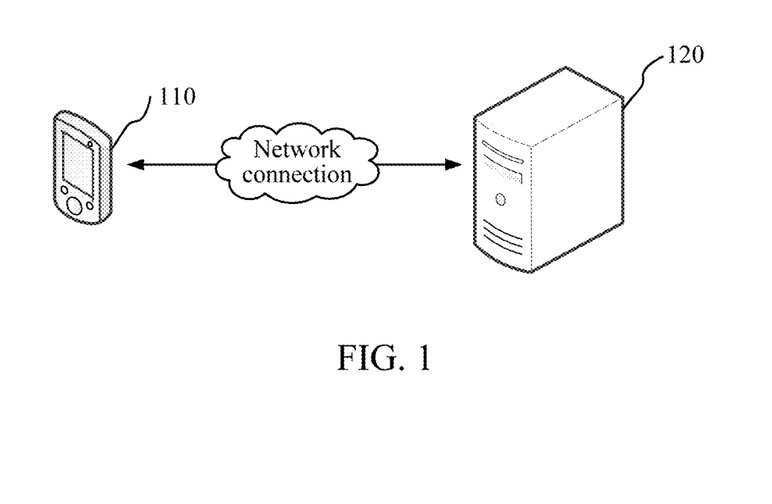
FIG. 1 is a diagram of an application environment of a navigation system according to an embodiment of the present disclosure.

As shown in FIG. 1, in an embodiment, a navigation system is provided, including a terminal 110 and a server 120. The terminal 110 includes a mobile terminal and a vehicular navigation device. The mobile terminal includes at least one of a mobile phone, a tablet computer, a smart watch, a person digital assistant (PDA), or the like. The server 120 may be an independent physical server or may be a physical server cluster.

Figure 2:
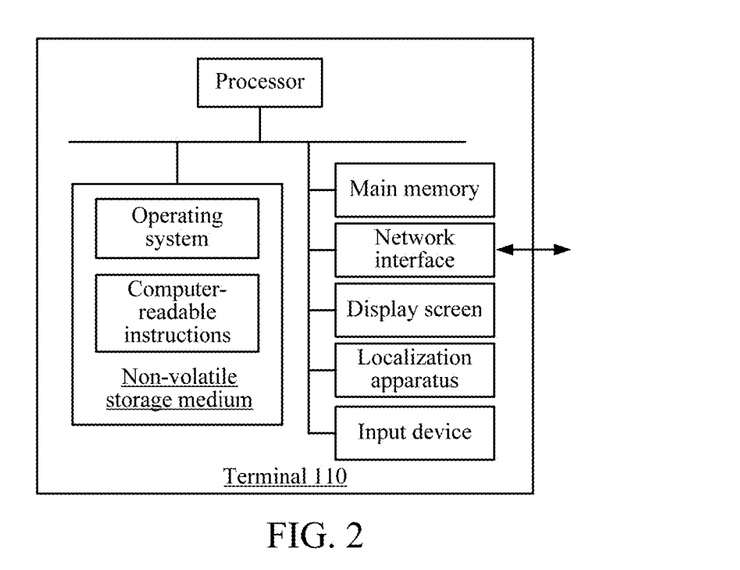
FIG. 2 is a schematic diagram of an inner structure of a terminal configured to implement a route-deviation recognition method according to an embodiment of the present disclosure.

As shown in FIG. 2, in an embodiment, a terminal 110 configured to implement a route-deviation recognition method is provided. The terminal 110 includes a processor, a non-volatile storage medium, a main memory, a network interface, a display screen, a positioning device, and an input device that are connected by using a system bus. The processor has functions of calculation and controlling operation of the terminal 110. The non-volatile storage medium includes at least one of a magnetic storage medium, an optical storage medium, or a flash storage medium. The non-volatile storage medium stores an operating system and computer-readable instructions. The computer-readable instructions, when executed by the processor, cause the processor to implement a route-deviation recognition method. The network interface is configured to connect to the server 120. The input device may be a physical button or touch layer overlapping the display screen. The touch layer and the display screen form a touchscreen. The positioning device may be a Global Positioning System (GPS) chip, a BeiDou navigation satellite positioning device, or a positioning device based on another localization system. The positioning device is configured to obtain positioning information of the terminal 110.

Figure 3:
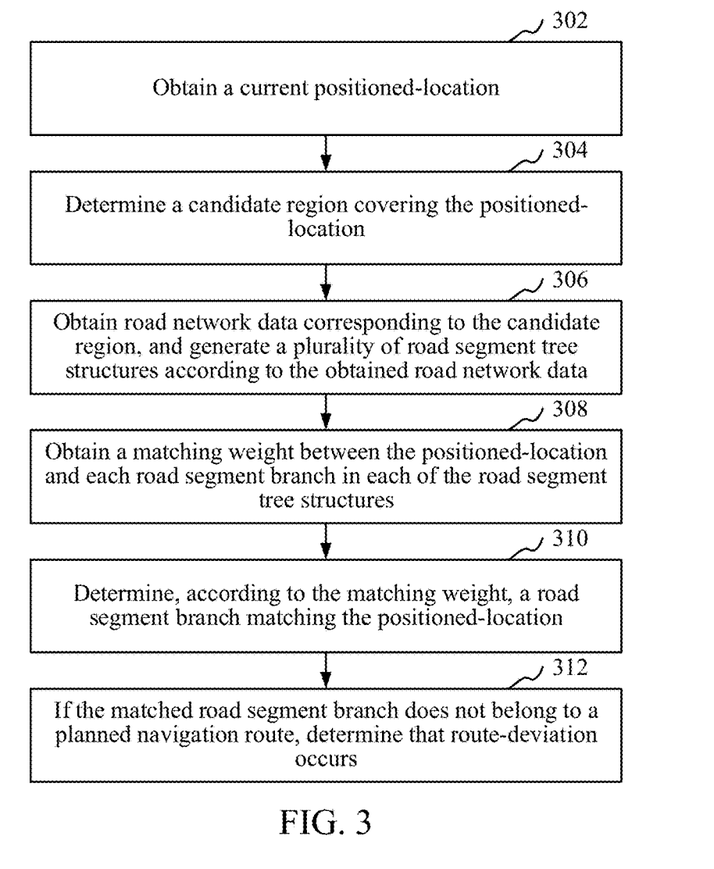
FIG. 3 is a schematic flowchart of a route-deviation recognition method according to an embodiment of the present disclosure.

As shown in FIG. 3, in an embodiment, a route-deviation recognition method is provided. The method may be applied to the terminal 110 and the server 120 in FIG. 1. In one embodiment, as an example for description, the method may be applied to the terminal 110 shown in FIG. 1 and FIG. 2. A navigation application runs on the terminal 110. The route-deviation recognition method is implemented by using the navigation application. The method specifically includes the following steps.

Step 302. Obtaining a current positioned-location.

Specifically, after determining a start point and a destination, the terminal may plan a navigation route, and navigate according to the navigation route. A positioned location may refer to the position determined by the terminal based on a positioning technology, such as using the GPS device. Thus, the terminal may obtain the current positioned-location of the terminal by using a built-in positioning device in a navigation process. The terminal may periodically perform step 302 and subsequent steps, to dynamically perform route-deviation recognition. The positioned-location may be represented by coordinates formed by the longitude and latitude of the current position or location.

Step 304. Determining a candidate region covering the positioned-location.

The candidate region is a region containing the current positioned-location in an electronic map. The candidate region covering the positioned-location means that the positioned-location is within the candidate region.

In an embodiment, step 304 includes: defining the candidate region of a preset shape according to a preset size by using the positioned-location as a geometric center.

Specifically, the terminal may extend towards four transverse and longitudinal directions from the positioned-location, to obtain a rectangular candidate region covering the positioned-location. The shape of the candidate region may be set in advance. In addition to rectangle, the candidate region may be a regular figure having a geometric center, such as a circle, an ellipse, or a triangle. For example, the terminal may extend towards four transverse and longitudinal directions from the positioned-location separately by a fixed distance, to obtain the rectangular candidate region whose side is twice as the fixed distance. The preset size may be set according to actual requirements. For example, if the candidate region is a rectangle, the side of the candidate region may be 500 meters to 10 kilometers.

In one embodiment, the positioned-location is at the geometric center of the determined candidate region. When a plurality of road-segment tree structures are subsequently generated, sufficient reference may be made to road network data around the positioned-location, such that the error rate of route-deviation recognition may be reduced.

In an embodiment, the geometric center of the candidate region may deviate from the positioned-location on the premise that the candidate region covers the positioned-location, for example, deviate to a direction opposite to the positioned-location. In this way, when generating the road-segment tree structures, the terminal refers to more road network data of a region whose positioned-location is towards the geometric center. If the geometric center deviates to the direction opposite to the positioned-location, the terminal refers more to a historical route of the terminal and, with same size candidate regions, the calculation amount may be similar, but the error rate of route-deviation recognition may be further reduced.

Step 306. Obtaining road network data corresponding to the candidate region, and generating a plurality of road-segment tree structures according to the obtained road network data.

The obtained road network data includes road segments corresponding to the candidate region and a connection relationship between the road segments, and may further include directions of the road segments. One road segment represents a passable path. A connection between the road segments represents communication between the corresponding paths. The road-segment tree structure is a tree structure including road segments with the connection relationship. If one road segment in the obtained road network data has no intersection with any other road segment, the road segment may be used as an independent road-segment tree structure. Generally, different road-segment tree structures have no connection relationship within the candidate region.

In an embodiment, the terminal may pull, from a server, the road network data corresponding to the candidate region, to form a road-segment tree structure according to the connection relationship between road segments in the pulled road network data. Alternatively, the terminal may obtain, from a local cache of the terminal, the road network data corresponding to the candidate region.

In an embodiment, the terminal may traverse the road segment topology structures in the road network data, to obtain all road segments within the range of the candidate region, and then analyze the topology structures between the obtained road segments, to combine the obtained road segments into the plurality of road-segment tree structures according to corresponding topology structures.

Figure 4:
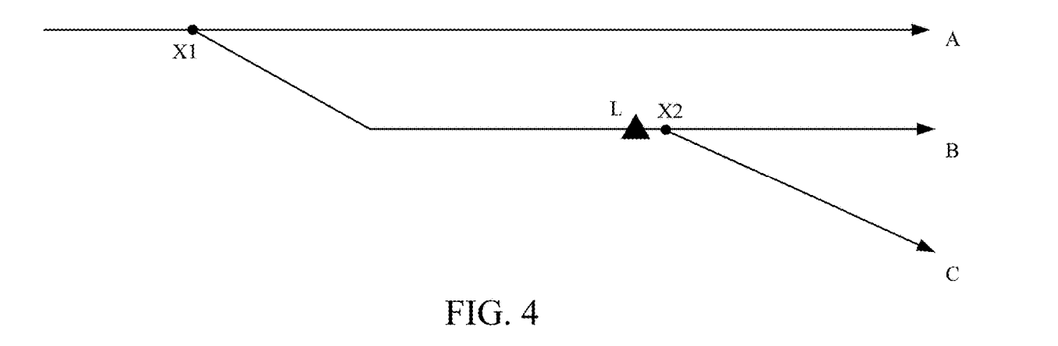
FIG. 4 is a schematic diagram of a partial road network in a scenario of parallel roads according to an embodiment of the present disclosure.

For example, referring to the schematic diagram of a partial road network shown in FIG. 4, the current positioned-location of the terminal is L, and an ingress node relative to the positioned-location L is a cross-point (node) X1 of a road segment A and a road segment B. The ingress node X1 is distant away from the positioned-location L, and searching for the ingress node costs a relatively long time. In actual application, the road network is more complex, there are many parallel road segments, and the parallel part between the road segments is likely to be very long. In such case, the time consumed in searching back for the ingress node may be perceptive for the user, causing the problem of slow response of route-deviation recognition.

Figure 5:
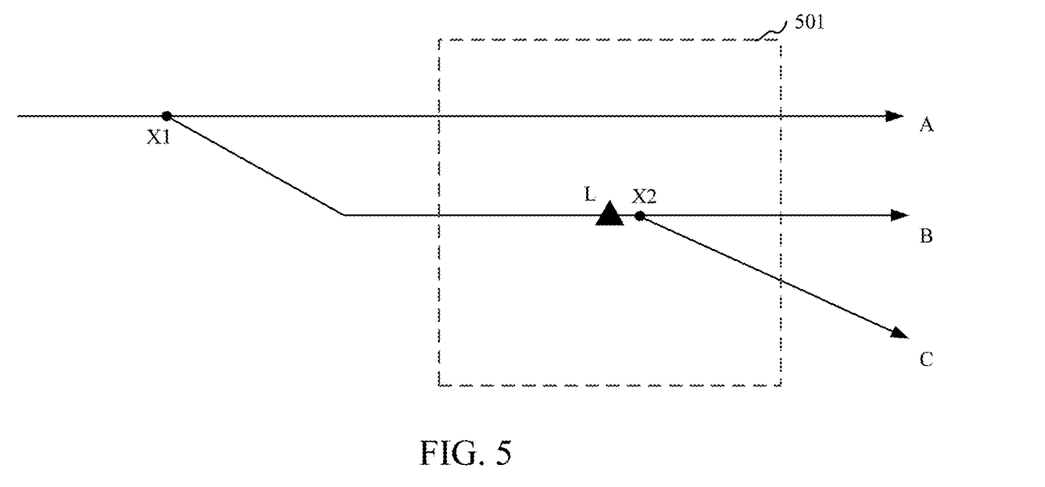
FIG. 5 is a schematic diagram of defining a candidate region covering a positioned-location in the schematic diagram of the partial road network shown in FIG. 4 according to an embodiment of the present disclosure.

Referring to FIG. 5, for the schematic diagram of the partial road network shown in FIG. 4, according to the route-deviation recognition method provided in one embodiment, a rectangular candidate region 501 of a preset size is defined according to the positioned-location L. In the candidate region 501, the road segment A does not intersect with other road segments, the road segment B interacts with a road segment C at a node X2, and two road-segment tree structures may be generated. One of the road-segment tree structures includes only the road segment A, and the other road-segment tree structure includes the road segment B and the road segment C that intersect with each other. In this way, there is no need to trace back to the ingress node to generate a road-segment tree structure, avoiding the problem of slow response caused due to searching back for the ingress node.

Figure 6:
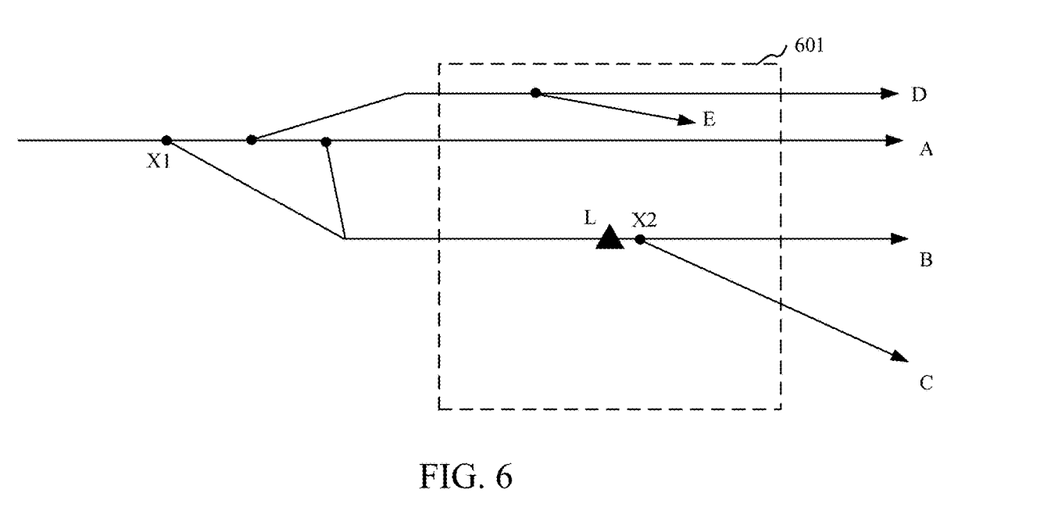
FIG. 6 is a schematic diagram of a partial road network in complex intersections according to an embodiment of the present disclosure.

Referring to FIG. 6, in a scenario of complex intersections, there are relatively a large number of ingress nodes, and it is easy to trace back to an incorrect ingress node. However, according to the route-deviation recognition method provided in one embodiment, after the rectangular candidate region 601 is defined, three road-segment tree structures may be generated. One of the road-segment tree structures includes a road segment D and a road segment E that intersect with each other, another road-segment tree structure includes a road segment A, and the final road-segment tree structure includes a road segment B and a road segment C that intersect with each other. In this way, incorrect route-deviation recognition caused due to tracing back to an incorrect ingress node may not occur.

Step 308. Obtaining a matching weight between the positioned-location and each road-segment branch in each of the road-segment tree structures.

The matching weight is a metric value of a matching degree between the positioned-location and each road-segment branch in each road-segment tree structure, and is used for searching for a road-segment branch actually corresponding to the positioned-location. The matching weight may be represented by a metric value by which the positioned-location deviates from the corresponding road-segment branch. In this case, a smaller matching weight indicates a higher matching degree between the road-segment branch and the positioned-location. Alternatively, the matching weight may be represented by a metric value of a similarity degree between the positioned-location and the corresponding road-segment branch. In this case, a larger matching weight indicates a higher matching degree between the road-segment branch and the positioned-location. In the road-segment tree structure, a connection line segment from one node to a sub-node thereof represents one road-segment branch. The road-segment branch may be a straight line, or may be a curve or a fold line.

Step 310. According to the matching weight, determining a road-segment branch matching the positioned-location.

Specifically, if a smaller matching weight indicates a higher matching degree between the corresponding road-segment branch and the positioned-location, the terminal may determine a road-segment branch having a smallest matching weight as the road-segment branch matching the positioned-location. If a larger matching weight indicates a higher matching degree between the corresponding road-segment branch and the positioned-location, the terminal may determine a road-segment branch having a largest matching weight as the road-segment branch matching the positioned-location. Further, the terminal may first sort the obtained matching weights in descending order or an ascending order before determining, according to the matching weight, the road-segment branch matching the positioned-location, to obtain the largest or the smallest matching weight, so as to determine the road-segment branch matching the positioned-location.

Step 312. If the matched road-segment branch does not belong to a planned navigation route, determine that route-deviation occurs.

Specifically, the terminal may determine whether the matched road-segment branch belongs to the planned navigation route. When determining that the matched road-segment branch belongs to the planned navigation route, the terminal ends the process, and waits to perform step 302 and subsequent steps. When determining that the matched road-segment branch does not belong to the planned navigation route, the terminal determines that route-deviation occurs, and performs route-deviation processing. To determine whether the matched road-segment branch belongs to the planned navigation route, the terminal may specifically determine whether the matched road-segment branch is consistent with a currently navigated road-segment branch, and if the matched road-segment branch is inconsistent with the currently navigated road-segment branch, determines that route-deviation occurs.

In the foregoing route-deviation recognition method, after the candidate region covering the current positioned-location is determined, road network data corresponding to the candidate region is obtained, to obtain a plurality of road-segment tree structures, so as to perform route-deviation recognition based on the plurality of road-segment tree structures. Because the plurality of road-segment tree structures is constructed directly by using the candidate region covering the current positioned-location, there is no need to trace back to the ingress node to construct a road-segment tree structure. In the scenario of parallel roads, parallel road segments form an independent road-segment tree structure, avoiding the problem of slow response caused due to searching for the ingress node. In the scenario of complex intersections, incorrect route-deviation recognition caused due to an incorrect ingress node can be avoided, reducing the error rate of route-deviation recognition.

Figure 7:
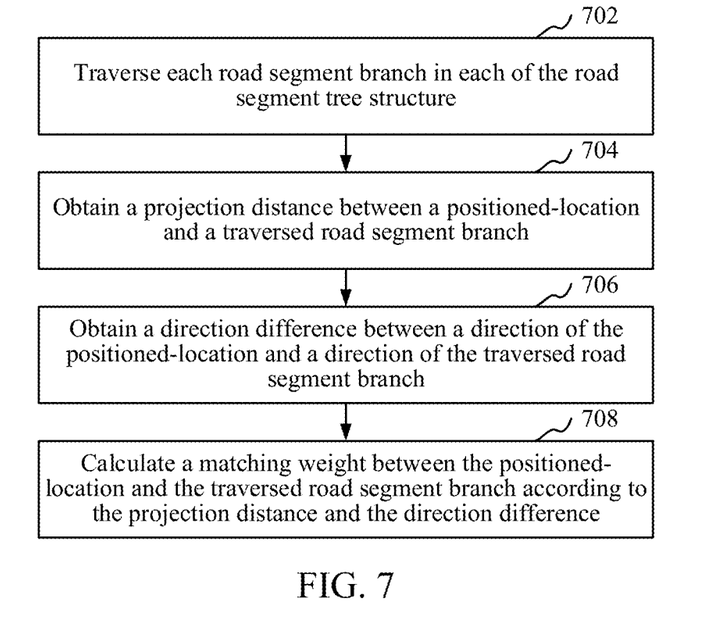
FIG. 7 is a schematic flowchart of a step of obtaining a matching weight between each road-segment branch in each road-segment tree structure and a positioned-location according to an embodiment of the present disclosure.

As shown in FIG. 7, in an embodiment, step 308 specifically includes the following steps:

Step 702. Traversing each road-segment branch in each of the road-segment tree structure.

Specifically, the terminal may traverse each road-segment branch in each road-segment tree structure according to a data structure of each road-segment tree structure, and may specifically perform traversing level-by-level from a root node of each road-segment tree structure. The terminal may alternatively randomly traverse each road-segment branch in each road-segment tree structure. In the traversing process, the terminal performs the following step 704 to step 708.

Step 704. Obtaining a projection distance between the positioned-location and the traversed road-segment branch.

The projection distance is a vertical distance between a projection of the positioned-location on an electronic map in which the road network is located and a corresponding road-segment branch. If the projection distance between the positioned-location and the traversed road-segment branch is 0, it indicates that the projection of the positioned-location exactly falls on the traversed road-segment branch. A larger projection distance indicates a further distance by which the positioned-location deviates from the road-segment branch. Specifically, the positioned-location may be projected in a manner similar to the manner of projecting a path onto an electronic map. Then, the vertical distance between the projected positioned-location and the corresponding road-segment branch is calculated to obtain the corresponding projection distance.

Step 706. Obtaining a direction difference between a direction of the positioned-location and a direction of the traversed road-segment branch.

Specifically, the positioned-location has a direction. The direction represents a moving direction of the terminal at the positioned-location, and may be determined according to a speed of the terminal at the positioned-location. The road-segment branch also has a direction. The direction represents a heading direction allowed by the road-segment branch. The direction difference represents a metric value between a difference between the direction of the positioned-location and the direction of the traversed road-segment branch. The direction difference may be represented by a direction angle difference between a direction angle of the positioned-location and a direction angle of the traversed road-segment branch.

Step 708. Calculating the matching weight between the positioned-location and the traversed road-segment branch according to the projection distance and the direction difference.

Specifically, the terminal may sum the projection distance and the direction difference according to a corresponding non-negative weight to obtain a weight sum, so as to obtain the matching weight between the positioned-location and the traversed road-segment branch. A weight of the projection distance and a weight of the direction difference are both non-negative coefficients during weight summation. The terminal may alternatively calculate the matching weight between the positioned-location and the traversed road-segment branch only according to the projection distance, for example, directly use the projection distance as the matching weight, or add the projection distance to a non-negative coefficient or multiple the projection distance by a non-negative coefficient to serve as the matching weight. When determining, according to the matching weight, whether the road-segment branch matches the positioned-location, the terminal may specifically determine the road-segment branch having the smallest matching weight as the road-segment branch matching the positioned-location.

In one embodiment, the matching weight between the positioned-location and the traversed road-segment branch is calculated according to the projection distance and the direction difference, so that the calculated matching weight can reflect a degree at which the positioned-location geographically deviates from each road-segment branch, and can also reflect a difference degree between a current moving direction and each road-segment branch. In this way, the calculated matching weight can reflect a matching degree between the positioned-location and each road-segment branch more accurately, and further, can perform route-deviation recognition more accurately, reducing the error rate of route-deviation recognition.

In an embodiment, step 708 includes: obtaining a historical direction difference accumulated value of the traversed road-segment branch; summing the projection distance, the direction difference, and the historical direction difference accumulated value according to the corresponding non-negative weight to obtain the weight sum, so as to obtain the matching weight between the positioned-location and the traversed road-segment branch. Step 310 includes: determining the road-segment branch having the smallest matching weight as the road-segment branch matching the positioned-location.

The historical direction difference accumulated value reflects an accumulation of a direction difference between a historical positioned-location and a corresponding road-segment branch. A corresponding direction difference obtained after each calculation may be added to the historical direction difference accumulated value for update. A larger number of cases in which the historical positioned-location is different from the corresponding road-segment branch indicates a larger historical direction difference accumulated value. The terminal may specifically calculate the matching weight according to the following formula (1):

$$W = N*n + M*m + G*g \quad (1)$$

where W is the matching weight, N, M, and G are non-negative weights, n is the projection distance, m is the direction difference, and g is the historical direction difference accumulated value.

According to the foregoing formula (1), if W=0, it indicates that the positioned-location perfectly matches the corresponding road-segment branch. A larger W indicates a lower matching degree between the positioned-location and the corresponding road-segment branch. The terminal may sort calculated matching weights according to values, to find a smallest matching weight, and determine a road-segment branch corresponding to the smallest matching weight as the road-segment branch matching the positioned-location.

In one embodiment, the historical direction difference accumulated value is considered when the matching weight is calculated, and the matching weight is corrected according to the history. A larger historical direction difference accumulated value indicates a lower possibility that the corresponding road-segment branch is not the matched road-segment branch, so as to further accurately reflect the matching degree between the positioned-location and each road-segment branch, and further to perform route-deviation recognition more accurately, reducing the error rate of route-deviation recognition.

In an embodiment, the route-deviation recognition method further includes: after it is determined that route-deviation occurs, obtaining a destination of the planned navigation route by using the positioned-location as a start point, generating a new navigation route from the start point to the destination, and navigating according to the new navigation route.

In one embodiment, after route-deviation occurs, the navigation route is immediately re-planned by using the positioned-location as the start point and by using the original destination of the planned navigation route as a new destination, and navigation is performed according to the new navigation route. Therefore, route-deviation behavior of a user may be responded in real time, and an effective navigation route is re-generated, to continue to provide a navigation service, improving the user experience of the navigation application.

Figure 8:
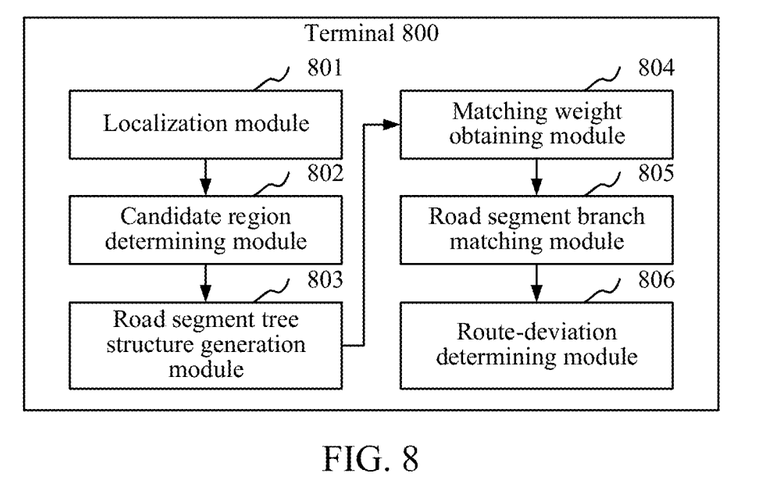
FIG. 8 is a structural block diagram of a terminal according to an embodiment of the present disclosure.

As shown in FIG. 8, in an embodiment, a terminal 800 is provided. An internal structure of the terminal 800 may correspond to the structure shown in FIG. 2. All or some of the modules described below may be implemented by software, hardware, or a combination thereof. The terminal 800 includes: a localization module 801, a candidate region determining module 802, a road-segment tree structure generation module 803, a matching weight obtaining module 804, a road-segment branch matching module 805, and a route-deviation determining module 806.

The localization module 801 is configured to obtain a current positioned-location.

Specifically, the localization module 801 may obtain the current positioned-location of the terminal by using a positioning device built in the terminal in a navigation process. The localization module 801 may be configured to periodically obtain the current positioned-location, so as to dynamically perform route-deviation recognition. The positioned-location may be represented by coordinates formed by the longitude and latitude of the current position.

The candidate region determining module 802 is configured to determine a candidate region covering the positioned-location.

The candidate region is a region containing the current positioned-location in an electronic map. The candidate region covering the positioned-location means that the positioned-location is within the range of the candidate region.

The road-segment tree structure generation module 803 is configured to obtain road network data corresponding to the candidate region, and generate a plurality of road-segment tree structures according to the obtained road network data.

The obtained road network data includes road segments corresponding to the candidate region and a connection relationship between the road segments, and may further include directions of the road segments. One road segment represents a passable path. A connection between the road segments represents communication between corresponding paths. The road-segment tree structure is a tree structure including road segments having the connection relationship. If one road segment in the obtained road network data has no intersection with any other road segment, the road segment may be used as an independent road-segment tree structure. Generally, different road-segment tree structures have no connection relationship within the candidate region.

In an embodiment, the road-segment tree structure generation module 803 may pull, from a server, the road network data corresponding to the candidate region, to form a road-segment tree structure according to the connection relationship between road segments in the pulled road network data. Alternatively, the road-segment tree structure generation module 803 may obtain, from a local cache of the terminal, the road network data corresponding to the candidate region.

In an embodiment, the road-segment tree structure generation module 803 may traverse the road segment topology structures in the road network data, to obtain all road segments within the range of the candidate region, and then analyze the topology structures between the obtained road segments, to combine the obtained road segments into the plurality of road-segment tree structures according to corresponding topology structures.

The matching weight obtaining module 804 is configured to obtain a matching weight between the positioned-location and each road-segment branch in each road-segment tree structure.

The matching weight is a metric value of a matching degree between the positioned-location and each road-segment branch in each road-segment tree structure, and is used for searching for a road-segment branch actually corresponding to the positioned-location. The matching weight may be represented by a metric value by which the positioned-location deviates from the corresponding road-segment branch. In such case, a smaller matching weight indicates a higher matching degree between the road-segment branch and the positioned-location. Alternatively, the matching weight may be represented by a metric value of a similarity degree between the positioned-location and the corresponding road-segment branch. In this case, a larger matching weight indicates a higher matching degree between the road-segment branch and the positioned-location. In the road-segment tree structure, a connection line segment from one node to a sub-node thereof represents one road-segment branch. The road-segment branch may be a straight line, or may be a curve or a fold line when necessary.

The road-segment branch matching module 805 is configured to determine, according to the matching weight, a road-segment branch matching the positioned-location.

Specifically, if a smaller matching weight indicates a higher matching degree between the corresponding road-segment branch and the positioned-location, the road-segment branch matching module 805 may determine a road-segment branch having a smallest matching weight as the road-segment branch matching the positioned-location. If a larger matching weight indicates a higher matching degree between the corresponding road-segment branch and the positioned-location, the road-segment branch matching module 805 may determine a road-segment branch having a largest matching weight as the road-segment branch matching the positioned-location. Further, the road-segment branch matching module 805 may first sort the obtained matching weights in descending order or an ascending order before determining, according to the matching weight, the road-segment branch matching the positioned-location, to obtain the largest or the smallest matching weight, so as to determine the road-segment branch matching the positioned-location.

The route-deviation determining module 806 is configured to: if the matched road-segment branch does not belong to a planned navigation route, determine that route-deviation occurs.

Specifically, the route-deviation determining module 806 may determine whether the matched road-segment branch belongs to the planned navigation route, and if determining that the matched road-segment branch belongs to the planned navigation route, end the process; and if determining that the matched road-segment branch does not belong to the planned navigation route, determine that route-deviation occurs.

After determining that the candidate region covers the current positioned-location, the terminal 800 obtains road network data corresponding to the candidate region, to obtain a plurality of road-segment tree structures, so as to perform route-deviation recognition based on the plurality of road-segment tree structures. Because the plurality of road-segment tree structures is constructed directly by using the candidate region covering the current positioned-location, there is no need to trace back to the ingress node to construct a road-segment tree structure. In a scenario of parallel roads, parallel road segments form an independent road-segment tree structure, avoiding the problem of slow response caused due to searching for the ingress node. In a scenario of complex intersections, incorrect route-deviation recognition caused due to an incorrect ingress node can be avoided, reducing the error rate of route-deviation recognition.

In an embodiment, the candidate region determining module 802 is specifically configured to define the candidate region of a preset shape according to a preset size by using the positioned-location as a geometric center.

Specifically, the candidate region determining module 802 may extend towards four transverse and longitudinal directions from the positioned-location, to obtain a rectangular candidate region covering the positioned-location. The shape of the candidate region is preset. In addition to rectangle, the candidate region may be a regular figure having a geometric center, such as a circle, an ellipse, or a triangle. For example, the candidate region determining module 802 may extend towards four transverse and longitudinal directions from the positioned-location separately by a fixed distance, to obtain the rectangular candidate region whose side is twice as the fixed distance. The preset size may be set according to requirements. For example, if the candidate region is a rectangle, the side of the candidate region may be 500 meters to 10 kilometers.

In one embodiment, the positioned-location is at the geometric center of the determined candidate region. When a plurality of road-segment tree structures is subsequently generated, reference may be made to road network data around the positioned-location, and the error rate of route-deviation recognition may be reduced.

In an embodiment, the geometric center of the candidate region may deviate from the positioned-location on the premise that the candidate region covers the positioned-location, for example, deviate to a direction opposite to the positioned-location. In this way, when generating the road-segment tree structures, the terminal emphatically refers to road network data of a region whose positioned-location is towards the geometric center. If the geometric center deviates to the direction opposite to the positioned-location, the terminal more refers to a historical route of the terminal. Calculation amounts of candidate regions of a same size are similar, but the error rate of route-deviation recognition may be further reduced.

Figure 9:
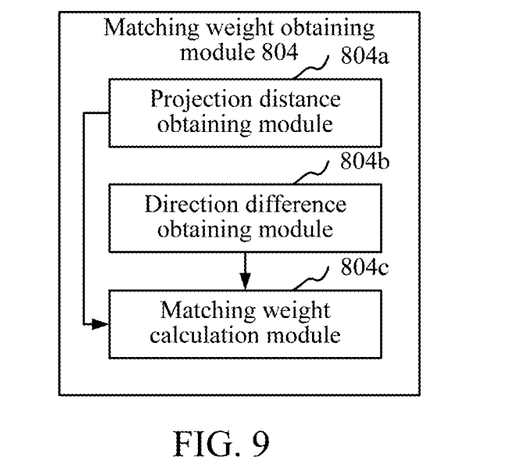
FIG. 9 is a structural block diagram of a matching weight obtaining module of a terminal according to an embodiment of the present disclosure.

As shown in FIG. 9, in an embodiment, the matching weight obtaining module 804 includes: a projection distance obtaining module 804a, a direction difference obtaining module 804b, and a matching weight calculation module 804c.

The projection distance obtaining module 804a is configured to alternatively randomly traverse each road-segment branch in each road-segment tree structure, and obtain a projection distance between the positioned-location and the traversed road-segment branch.

Specifically, the projection distance obtaining module 804a may traverse each road-segment branch in each road-segment tree structure according to a data structure of each road-segment tree structure, and may specifically perform traversing layer by layer from a root node of each road-segment tree structure. The projection distance obtaining module 804a may alternatively randomly traverse each road-segment branch in each road-segment tree structure.

The projection distance is a vertical distance between a projection of the positioned-location on an electronic map in which the road network is located and a corresponding road-segment branch. If the projection distance between the positioned-location and the traversed road-segment branch is 0, it indicates that the projection of the positioned-location exactly falls on the traversed road-segment branch. A larger projection distance indicates a further distance by which the positioned-location deviates from the road-segment branch. Specifically, the projection distance obtaining module 804a may project the positioned-location in a manner similar to the manner of projecting a path onto an electronic map. Then, the vertical distance between the projected positioned-location and the corresponding road-segment branch is calculated to obtain the corresponding projection distance.

The direction difference obtaining module 804b is configured to obtain the direction difference between a direction of the positioned-location and a direction of the traversed road-segment branch.

Specifically, the positioned-location has a direction. The direction represents a moving direction of the terminal at the positioned-location, and may be determined according to a speed of the terminal at the positioned-location. The road-segment branch also has a direction. The direction represents a heading direction allowed by the road-segment branch. The direction difference represents a metric value between a difference between the direction of the positioned-location and the direction of the traversed road-segment branch. The direction difference may be represented by a direction angle difference between a direction angle of the positioned-location and a direction angle of the traversed road-segment branch.

The matching weight calculation module 804c is configured to calculate the matching weight between the positioned-location and the traversed road-segment branch according to the projection distance and the direction difference.

Specifically, the matching weight calculation module 804c may sum the projection distance and the direction difference according to a corresponding non-negative weight to obtain a weight sum, so as to obtain the matching weight between the positioned-location and the traversed road-segment branch. A weight of the projection distance and a weight of the direction difference are both non-negative coefficients during weight summation. The matching weight calculation module 804c may alternatively calculate the matching weight between the positioned-location and the traversed road-segment branch only according to the projection distance, for example, directly use the projection distance as the matching weight, or add the projection distance to a non-negative coefficient or multiple the projection distance by a non-negative coefficient to serve as the matching weight. When determining, according to the matching weight, whether the road-segment branch matches the positioned-location, matching weight calculation module 804c may specifically determine a road-segment branch having a smallest matching weight as the road-segment branch matching the positioned-location.

In one embodiment, the matching weight between the positioned-location and the traversed road-segment branch is calculated according to the projection distance and the direction difference, so that the calculated matching weight can reflect a degree at which the positioned-location geographically deviates from each road-segment branch, and can also reflect a difference degree between a current moving direction and each road-segment branch. In this way, the calculated matching weight can reflect a matching degree between the positioned-location and each road-segment branch more accurately, and further, can perform route-deviation recognition more accurately, reducing the error rate of route-deviation recognition.

Figure 10:
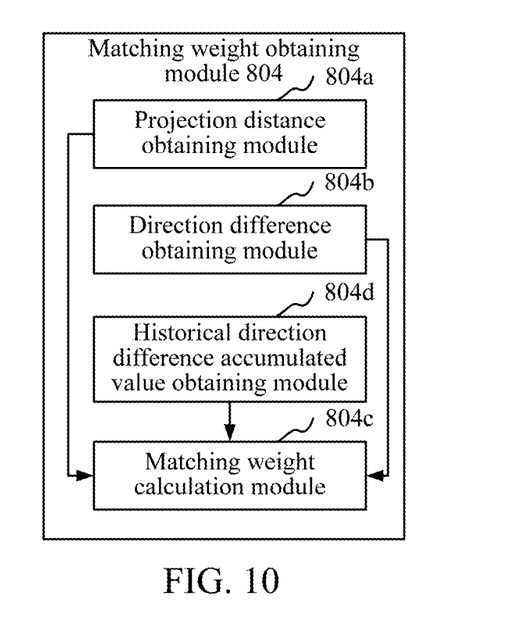
FIG. 10 is a structural block diagram of a matching weight obtaining module of a terminal according to another embodiment of the present disclosure.

As shown in FIG. 10, in an embodiment, the matching weight obtaining module 804 further includes a historical direction difference accumulated value obtaining module 804d, configured to obtain a historical direction difference accumulated value of the traversed road-segment branch.

The historical direction difference accumulated value reflects an accumulation of a direction difference between a historical positioned-location and a corresponding road-segment branch. A corresponding direction difference obtained after each calculation may be added to the historical direction difference accumulated value for update. A larger number of cases in which the historical positioned-location is different from the corresponding road-segment branch indicates a larger historical direction difference accumulated value.

The matching weight calculation module 804c is further configured to sum the projection distance, the direction difference, and the historical direction difference accumulated value according to a corresponding non-negative weight to obtain a weight sum, so as to obtain the matching weight between the positioned-location and the traversed road-segment branch.

The matching weight calculation module 804c may specifically calculate the matching weight according to the following formula (1):

$$W = N*n + M*m + G*g \quad (1)$$

where W is the matching weight, N, M, and G are non-negative weights, n is the projection distance, m is the direction difference, and g is the historical direction difference accumulated value.

According to the foregoing formula (1), if W=0, it indicates that the positioned-location perfectly matches the corresponding road-segment branch. A larger W indicates a lower matching degree between the positioned-location and the corresponding road-segment branch.

The road-segment branch matching module 805 is further configured to determine the road-segment branch having the smallest matching weight as the road-segment branch matching the positioned-location.

The road-segment branch matching module 805 may sort calculated matching weights according to values, to find the smallest matching weight, and determine a road-segment branch corresponding to the smallest matching weight as the road-segment branch matching the positioned-location.

In one embodiment, the historical direction difference accumulated value is considered when the matching weight is calculated, and the matching weight is corrected according to a history. A larger historical direction difference accumulated value indicates a lower possibility that the corresponding road-segment branch is not the matched road-segment branch, so as to further accurately reflect the matching degree between the positioned-location and each road-segment branch, and further to perform route-deviation recognition more accurately, reducing the error rate of route-deviation recognition.

Figure 11:
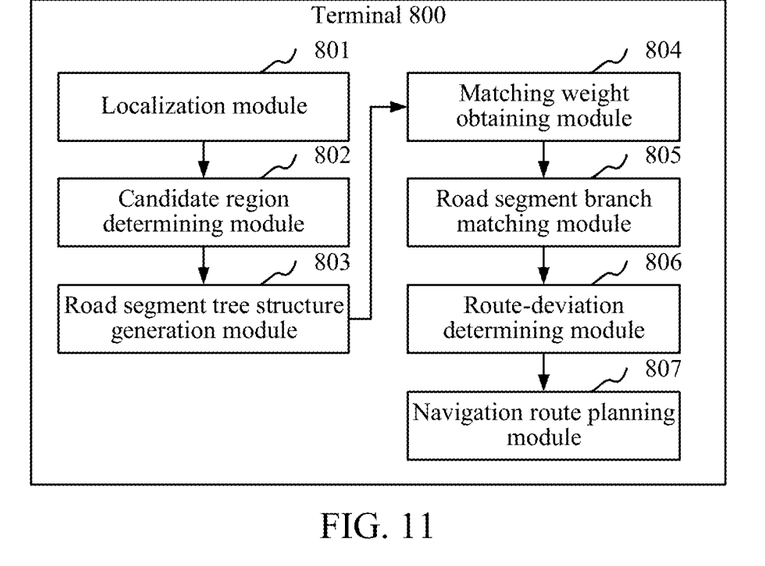
FIG. 11 is a structural block diagram of a matching weight obtaining module of a terminal according to another embodiment of the present disclosure.

As shown in FIG. 11, in an embodiment, the terminal 800 further includes a navigation route planning module 807, configured to: after it is determined that route-deviation occurs, obtain a destination of the planned navigation route by using the positioned-location as the start point, generate a new navigation route from the start point to the destination, and navigate according to the new navigation route.

In one embodiment, after route-deviation occurs, the navigation route planning module 807 immediately re-plans the navigation route by using the positioned-location as the start point and by using the original destination of the planned navigation route as a new destination, and navigates according to the new navigation route. Therefore, route-deviation behavior of a user may be responded in real time, and an effective navigation route is re-generated, to continue to provide a navigation service, improving the user experience of the navigation application.

In an embodiment, a terminal includes a memory and a processor. The memory stores computer-readable instructions. The computer-readable instructions, when executed by the processor, cause the processor to perform the following steps: obtaining a current positioned-location; determining a candidate region covering the positioned-location; obtaining road network data corresponding to the candidate region, and generating a plurality of road-segment tree structures according to the obtained road network data; obtaining a matching weight between the positioned-location and each road-segment branch in each of the road-segment tree structures; determining, according to the matching weight, a road-segment branch matching the positioned-location; and if the matched road-segment branch does not belong to a planned navigation route, determining that route-deviation occurs.

In an embodiment, the determining a candidate region covering the positioned-location includes: defining the candidate region of a preset shape according to a preset size by using the positioned-location as a geometric center.

In an embodiment, the defining the candidate region of a preset shape according to a preset size by using the positioned-location as a geometric center includes: respectively extending towards four transverse and longitudinal directions from the positioned-location, to obtain a rectangular candidate region covering the positioned-location.

In an embodiment, the obtaining road network data corresponding to the candidate region, and generating a plurality of road-segment tree structures according to the obtained road network data includes: traversing road segment topology structures in the road network data, to obtain all road segments within the candidate region; and analyzing the topology structures between the obtained road segments, to combine the obtained road segments into the plurality of road-segment tree structures according to corresponding topology structures.

In an embodiment, the obtaining a matching weight between the positioned-location and each road-segment branch in each of the road-segment tree structures includes: traversing each road-segment branch in each of the road-segment tree structure; obtaining a projection distance between the positioned-location and the traversed road-segment branch; obtaining a direction difference between a direction of the positioned-location and a direction of the traversed road-segment branch; and calculating the matching weight between the positioned-location and the traversed road-segment branch according to the projection distance and the direction difference.

In an embodiment, the calculating the matching weight between the positioned-location and the traversed road-segment branch according to the projection distance and the direction difference includes: obtaining a historical direction difference accumulated value of the traversed road-segment branch; and summing the projection distance, the direction difference, and the historical direction difference accumulated value according to a corresponding non-negative weight to obtain a weight sum, so as to obtain the matching weight between the positioned-location and the traversed road-segment branch. The determining, according to the matching weight, a road-segment branch matching the positioned-location includes: determining a road-segment branch having a smallest matching weight as the road-segment branch matching the positioned-location.

In an embodiment, the computer-readable instructions, when executed by the processor, further cause the processor to perform the following steps: after it is determined that route-deviation occurs, obtaining a destination of the planned navigation route by using the positioned-location as a start point, generating a new navigation route from the start point to the destination, and navigating according to the new navigation route.

In an embodiment, one or more computer-readable non-volatile storage mediums including computer-readable instructions are provided. The computer-readable instructions, when executed by the one or more processors, cause the one or more processors to perform the following step: obtaining a current positioned-location; determining a candidate region covering the positioned-location; obtaining road network data corresponding to the candidate region, and generating a plurality of road-segment tree structures according to the obtained road network data; obtaining a matching weight between the positioned-location and each road-segment branch in each of the road-segment tree structures; determining, according to the matching weight, a road-segment branch matching the positioned-location; and if the matched road-segment branch does not belong to a planned navigation route, determining that route-deviation occurs.

In an embodiment, the determining a candidate region covering the positioned-location includes: defining the candidate region of a preset shape according to a preset size by using the positioned-location as a geometric center.

In an embodiment, the obtaining road network data corresponding to the candidate region, and generating a plurality of road-segment tree structures according to the obtained road network data includes: traversing road segment topology structures in the road network data, to obtain all road segments within the candidate region; and analyzing the topology structures between the obtained road segments, to combine the obtained road segments into the plurality of road-segment tree structures according to corresponding topology structures.

In an embodiment, the obtaining a matching weight between the positioned-location and each road-segment branch in each of the road-segment tree structures includes: traversing each road-segment branch in each of the road-segment tree structure; obtaining a projection distance between the positioned-location and the traversed road-segment branch; obtaining a direction difference between a direction of the positioned-location and a direction of the traversed road-segment branch; and calculating the matching weight between the positioned-location and the traversed road-segment branch according to the projection distance and the direction difference.

In an embodiment, the calculating the matching weight between the positioned-location and the traversed road-segment branch according to the projection distance and the direction difference includes: obtaining a historical direction difference accumulated value of the traversed road-segment branch; and summing the projection distance, the direction difference, and the historical direction difference accumulated value according to a corresponding non-negative weight to obtain a weight sum, so as to obtain the matching weight between the positioned-location and the traversed road-segment branch. The determining, according to the matching weight, a road-segment branch matching the positioned-location includes: determining a road-segment branch having a smallest matching weight as the road-segment branch matching the positioned-location.

In an embodiment, the computer-readable instructions, when executed by the processor, further cause the processor to perform the following steps: after it is determined that route-deviation occurs, obtaining a destination of the planned navigation route by using the positioned-location as a start point, generating a new navigation route from the start point to the destination, and navigating according to the new navigation route.

A person of ordinary skill in the art may understand that all or some of the processes of the methods in the embodiments may be implemented by a computer program instructing relevant hardware. The computer program may be stored in a computer-readable storage medium. When the program is executed, the processes of the methods in the embodiments are performed. The storage medium may be a non-volatile storage medium such as a magnetic disk, an optical disc, or a read-only memory (ROM), or may be a random-access memory (RAM) or the like.

Technical features of the foregoing embodiments may be randomly combined. For brevity of description, not all possible combinations of the technical features in the foregoing embodiments are described. However, as long as combinations of these technical features do not contradict each other, it should be considered that the combinations all fall within the scope recorded by this specification.

The foregoing embodiments only describe several implementations of the present disclosure, which are described specifically and in detail, and therefore cannot be construed as a limitation to the patent scope of the present disclosure. It should be noted that, a person of ordinary skill in the art may make various changes and improvements without departing from the idea of the present disclosure, which shall all fall within the protection scope of the present disclosure. The protection scope of the present disclosure shall be subject to the appended claims.

What is claimed is:
1. A route-deviation recognition method, comprising:
obtaining a current position;
determining a candidate region covering the current position;
generating a plurality of road-segment tree branches according to the candidate region;
obtaining a projection distance between the current position and each of the plurality of road-segment branches;
obtaining a direction difference between a direction of the current position and a direction of the each of the plurality of road-segment branches;

obtaining a matching weight between the current position and the each of the road-segment branches according to the projection distance and the direction difference;

obtaining a historical direction difference accumulated value of the each of the plurality of road-segment branches;

summing the projection distance, the direction difference, and the historical direction difference accumulated value according to a corresponding non-negative weight to obtain a weight sum as the matching weight between the current position and the each of the plurality of road-segment branches;

determining, a road-segment branch having a smallest matching weight as a matched road-segment branch matching the current position; and upon determining the matched road-segment branch does not belong to a planned navigation route, determining that route-deviation occurs.

2. The method according to claim 1, wherein the determining the candidate region covering the current location comprises:

defining the candidate region of a preset shape and of a preset size by using the current position as a geometric center of the preset shape.

3. The method according to claim 2, wherein the defining the candidate region of the preset shape and of the preset size by using the current position as the geometric center of the preset shape comprises:

extending towards four transverse and longitudinal directions from the current position, to obtain a rectangular candidate region covering the current position.

4. The method according to claim 1, further comprising:

after determining that route-deviation occurs, obtaining a destination of the planned navigation route and, using the current position as a start point, generating a new navigation route from the start point to the destination, and navigating according to the new navigation route.

5. A terminal, comprising: a memory storing computer-readable instructions; and a processor coupled to the memory and, when executing the computer-readable instructions, configured to perform:

obtaining a current position;

determining a candidate region covering the current position;

generating a plurality of road-segment tree branches according to the candidate region;

obtaining a projection distance between the current position and each of the plurality of road-segment branches;

obtaining a direction difference between a direction of the current position and a direction of the each of the plurality of road-segment branches;

obtaining a matching weight between the current position and the each of the road-segment branches according to the projection distance and the direction difference;

obtaining a historical direction difference accumulated value of the each of the plurality of road-segment branches;

summing the projection distance, the direction difference, and the historical direction difference accumulated value according to a corresponding non-negative weight to obtain a weight sum as the matching weight between the current position and the each of the plurality of road-segment branches;

determining a road-segment branch having a smallest matching weight as a matched road-segment branch matching the current position; and upon determining the matched road-segment branch does not belong to a planned navigation route, determining that route-deviation occurs.

6. The terminal according to claim 5, wherein the determining the candidate region covering the current position comprises:

defining the candidate region of a preset shape and of a preset size by using the current position as a geometric center of the preset shape.

7. The terminal according to claim 6, wherein the defining the candidate region of the preset shape and of the preset size by using the current position as the geometric center of the preset shape comprises:

extending towards four transverse and longitudinal directions from the current position, to obtain a rectangular candidate region covering the current position.

8. The terminal according to claim 5, where the processor is further configured to perform:

after determining that route-deviation occurs, obtaining a destination of the planned navigation route and, using the current position as a start point, generating a new navigation route from the start point to the destination, and navigating according to the new navigation route.

9. A non-transitory computer-readable storage medium storing computer program instructions executable by at least one processor to perform:

obtaining a current position;

determining a candidate region covering the current position;

generating a plurality of road-segment tree branches according to the candidate region;

obtaining a projection distance between the current position and each of the plurality of road-segment branches;

obtaining a direction difference between a direction of the current position and a direction of the each of the plurality of road-segment branches;

obtaining a matching weight between the current position and the each of the road-segment branches according to the projection distance and the direction difference;

obtaining a historical direction difference accumulated value of the each of the plurality of road-segment branches;

summing the projection distance, the direction difference, and the historical direction difference accumulated value according to a corresponding non-negative weight to obtain a weight sum as the matching weight between the current position and the each of the plurality of road-segment branches;

determining a road-segment branch having a smallest matching weight as a matched road-segment branch matching the current position; and upon determining the matched road-segment branch does not belong to a planned navigation route, determining that route-deviation occurs.

10. The non-transitory computer-readable storage medium according to claim 9, wherein the determining the candidate region covering the current position comprises:

defining the candidate region of a preset shape and of a preset size by using the current position as a geometric center of the preset shape.

11. The non-transitory computer-readable storage medium according to claim 9, further containing computer program instructions executable by the at least one processor to perform:

after determining that route-deviation occurs, obtaining a destination of the planned navigation route and, using the current position as a start point, generating a new navigation route from the start point to the destination, and navigating according to the new navigation route.

\* \* \* \* \*